United States Patent
Kuipers

(10) Patent No.: US 11,621,793 B2
(45) Date of Patent: Apr. 4, 2023

(54) TIME-DIVISION DUPLEXING SYSTEMS AND METHODS FOR REDUCING CROSSTALK ASSOCIATED WITH SIGNALS COMMUNICATED BY COORDINATED DYNAMIC TIME ASSIGNMENT TRANSCEIVERS

(71) Applicant: ADTRAN, INC., Huntsville, AL (US)

(72) Inventor: Martin Kuipers, Dallgow-Doberitz (DE)

(73) Assignee: ADTRAN, Inc., Huntsville, AL (US)

( * ) Notice: Subject to any disclaimer, the term of this patent is extended or adjusted under 35 U.S.C. 154(b) by 177 days.

(21) Appl. No.: 15/713,143

(22) Filed: Sep. 22, 2017

(65) Prior Publication Data
US 2019/0280795 A1 Sep. 12, 2019

(51) Int. Cl.
| | | |
|---|---|---|
| *H04L 12/00* | (2006.01) | |
| *H04J 3/10* | (2006.01) | |
| *H04J 3/16* | (2006.01) | |
| *H04L 5/14* | (2006.01) | |
| *H04B 3/32* | (2006.01) | |
| *H04J 3/06* | (2006.01) | |

(52) U.S. Cl.
CPC ................. *H04J 3/10* (2013.01); *H04B 3/32* (2013.01); *H04J 3/1694* (2013.01); *H04L 5/14* (2013.01); *H04J 3/0685* (2013.01)

(58) Field of Classification Search
None
See application file for complete search history.

(56) References Cited

U.S. PATENT DOCUMENTS

| | | | |
|---|---|---|---|
| 9,294,212 B2 | 3/2016 | Kuipers et al. | |
| 9,614,582 B2 | 4/2017 | Chang et al. | |
| 9,614,583 B2 | 4/2017 | Goodson et al. | |
| 2014/0307749 A1* | 10/2014 | Liang | H04W 56/001 370/509 |
| 2014/0334283 A1* | 11/2014 | Chang | H04M 11/062 370/201 |
| 2015/0215059 A1* | 7/2015 | Kerpez | H04J 3/10 379/406.01 |

(Continued)

FOREIGN PATENT DOCUMENTS

| | | |
|---|---|---|
| EP | 3182636 A1 | 6/2017 |
| WO | 20130152742 A1 | 10/2013 |

OTHER PUBLICATIONS

Australian Examination Report dated Jun. 3, 2022.

*Primary Examiner* — Noel R Beharry
*Assistant Examiner* — Lionel Preval
(74) *Attorney, Agent, or Firm* — Maynard Cooper & Gale, P.C.; Jon E. Holland

(57) ABSTRACT

A time-division duplexing (TDD) system reduces crosstalk associated with signals communicated by coordinated dynamic time assignment (cDTA) transceivers. In some embodiments, the TDD system has both cDTA transceivers and legacy transceivers. Based on the dynamic allocation of downstream and upstream timeslots for the cDTA transceivers, timeslots for the legacy transceivers are selectively muted in an effort to limit the amount of near-end crosstalk (NEXT) that occurs in the TDD system. Thus, subscriber lines coupled to both cDTA transceivers and legacy transceivers may be bound within the same binder without significantly increasing crosstalk to unacceptable levels.

29 Claims, 10 Drawing Sheets

(56) References Cited

U.S. PATENT DOCUMENTS

| | | | |
|---|---|---|---|
| 2015/0349938 A1* | 12/2015 | Trojer | H04L 5/1469 |
| | | | 370/281 |
| 2016/0036491 A1* | 2/2016 | Sorbara | H04L 27/26 |
| | | | 370/294 |
| 2016/0164621 A1* | 6/2016 | Tsiaflakis | H04J 3/1694 |
| | | | 379/406.04 |
| 2016/0248478 A1* | 8/2016 | Troch | G06F 13/4086 |
| 2019/0207736 A1* | 7/2019 | Ben-Tovim | H04L 5/0087 |
| 2020/0266853 A1* | 8/2020 | Strobel | H04B 1/38 |

* cited by examiner

TIME-DIVISION DUPLEXING SYSTEMS AND METHODS FOR REDUCING CROSSTALK ASSOCIATED WITH SIGNALS COMMUNICATED BY COORDINATED DYNAMIC TIME ASSIGNMENT TRANSCEIVERS

RELATED ART

In a time-division duplexing (TDD) system, data is communicated in both an upstream direction and a downstream direction through the same communication channel, such as a subscriber line. The timing of communication is controlled so that upstream transmissions are separated in time from downstream transmissions in order to avoid interference between upstream and downstream signals. In this regard, the channel is typically divided into frames having a predefined format in accordance with a desired protocol. Each frame usually has a group of downstream (DS) timeslots dedicated for downstream transmissions and a group of upstream (US) timeslots dedicated for upstream transmissions. In an attempt to maximize communication efficiency, the downstream timeslots are often grouped together and the upstream timeslots are often grouped together such that transceivers transition between downstream communication and upstream communication once per frame. A transition in the direction of communication (e.g., from downstream communication to upstream communication) shall be referred to hereafter as a "DS/US transition."

In telecommunication systems, many subscriber lines are often bound within a single binder (e.g., cable) in order to facilitate deployment. Subscriber lines bound within the same binder are sufficiently close in proximity such that crosstalk can couple from one subscriber line to another thereby degrading signal quality. In a TDD system, significant near-end crosstalk (NEXT) can be introduced if downstream communication occurs across some of the subscriber lines in a binder while upstream communication simultaneously occurs across other subscriber lines in the same binder. For this reason, various standards have been developed for TDD systems in an attempt to prevent or limit simultaneous upstream and downstream communication at the same frequency for subscriber lines in the same binder so that NEXT can be avoided or reduced.

One way to limit NEXT for a group of subscriber lines in the same binder is to synchronize the communication so that DS/US transitions on the subscriber lines occur at the same time. That is, the timing of the DS/US transitions may be controlled so that communication occurs in the same direction for all of the subscriber lines at any given time. This can be achieved by provisioning the transceivers to have a fixed frame format so that the DS/US transition occurs at the same point in each frame. Thus, for each frame, the number of downstream timeslots and the number of upstream timeslot are both fixed. Many legacy transceivers currently deployed in the field have such a fixed frame format.

In an effort to optimize communications, some protocols have been developed that permit coordinated dynamic time assignment (cDTA). According to cDTA, the frame format is flexible to permit dynamic assignment of upstream and downstream capacity. That is, the timing of a frame's DS/US transition within the frame can be dynamically controlled to permit a greater downstream capacity (e.g., increased number of downstream timeslots) or a greater upstream capacity (e.g., increased number of upstream timeslots) depending on dynamic conditions, such as upstream and downstream traffic loads. The dynamic time assignment is "coordinated" for a group of subscriber lines in that all of the transceivers connected to the group adjust their timing of downstream and upstream timeslots in the same way so that NEXT is avoided or reduced.

Unfortunately, the existence of legacy transceivers using a fixed frame format can hamper efforts to rollout cDTA transceivers that are capable of dynamically assigning upstream and downstream capacity. In this regard, as described above, at least some legacy transceivers may be incapable of adjusting the timing of downstream or upstream timeslots within a frame. If a cDTA transceiver is connected to a subscriber line in the same binder as a subscriber line connected to a legacy transceiver, then adjusting the timing of downstream and upstream timeslots by the cDTA transceiver may introduce significant levels of NEXT since the legacy transceiver may be incapable of similarly adjusting the timing of its downstream and upstream timeslots. While it is possible to replace legacy transceivers with cDTA transceivers to avoid this problem, the process of replacing legacy transceivers, particularly legacy transceivers on the customer premises (CP) side of a TDD system, can be burdensome and expensive.

Thus, a heretofore unaddressed need exists in the art for techniques that permit the use of cDTA transceivers in a TDD system that employs legacy transceivers having a fixed frame format without introducing a significant increase in NEXT.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to time-division duplexing (TDD) systems and methods that reduce crosstalk associated with signals communicated by coordinated dynamic time assignment (cDTA) transceivers. In some embodiments, a TDD system has both cDTA transceivers and legacy transceivers connected to subscriber lines bound within the same binder. The cDTA transceivers operate in accordance with a protocol that employs coordinated dynamic time assignment to dynamically adjust the timing of downstream and upstream timeslots, and the legacy transceivers operate in accordance with a protocol that employs a fixed frame format where the number of downstream timeslots and the number of upstream timeslots are fixed for each frame.

Based on the dynamic allocation of downstream and upstream timeslots for the cDTA transceivers, timeslots for the legacy transceivers are selectively muted in an effort to limit the amount of near-end crosstalk (NEXT) that occurs in the TDD system. As an example, downstream timeslots for a legacy transceiver overlapping with (i.e., occurring at the same time as) upstream timeslots for the cDTA transceivers may be muted in order to reduce the amount of NEXT that couples from the line of the legacy transceiver to the lines of the cDTA transceivers. Thus, subscriber lines coupled to cDTA transceivers and legacy transceivers may be bound within the same binder without significantly increasing crosstalk to unacceptable levels.

Figure 1:
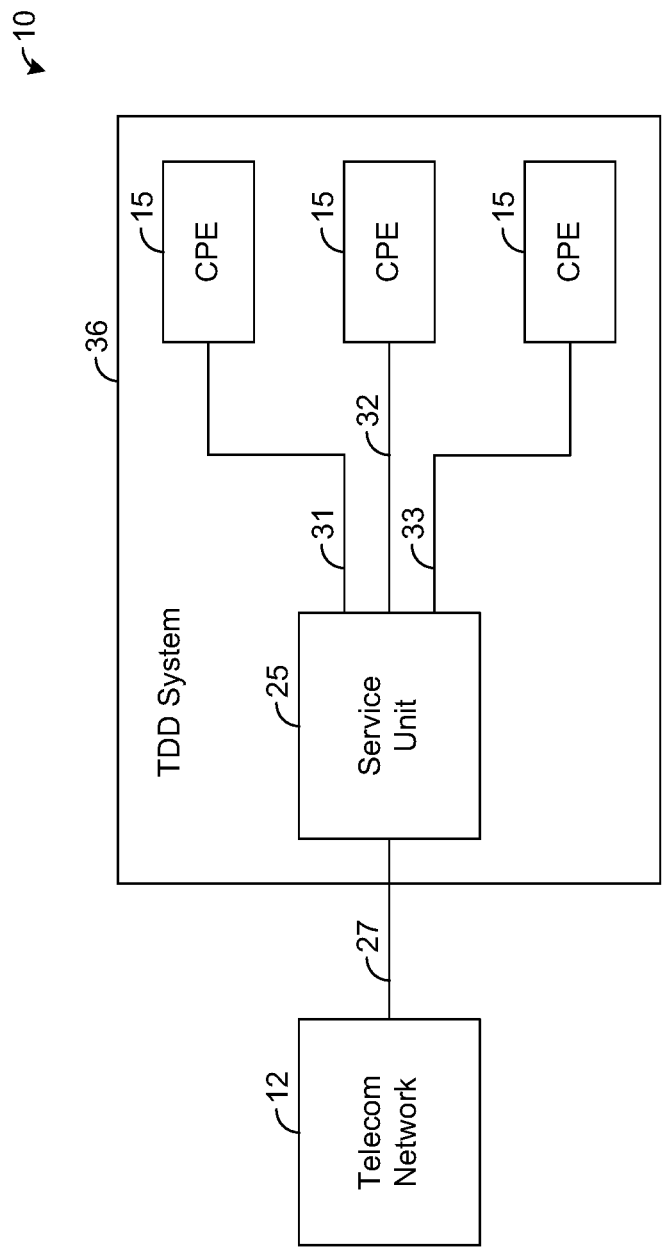
FIG. 1 is a block diagram illustrating an exemplary embodiment of a communication system in accordance with the present disclosure.

FIG. 1 depicts an exemplary embodiment of a communication system 10. As shown by FIG. 1, the system 10 comprises a telecommunication network 12 configured to communicate with customer premises equipment (CPE) 15, which may comprise one or more customer premises (CP) transceivers (not shown in FIG. 1). In this regard, the network 12 may be coupled to a service unit (SU) 25 at a distribution point or other intermediate point between the network 12 and the CPE 15. The service unit 25 may be coupled to the network 12 via a network line 27 and to the CPE 15 via a plurality of subscriber lines 31-33, such as twisted-wire pairs. In some embodiments, the network line 27 comprises an optical fiber, but other types of network lines, such as one or more twisted-wire pairs, may be used in other embodiments. For simplicity of illustration, FIG. 1 depicts three subscriber lines 31-33, but there can be any number of subscriber lines 31-33 in other embodiments. In some embodiments, the service unit 25, CPE 15, and subscriber lines 31-33 implement a time-division multiplexing (TDD) system 36 where data is communicated upstream and downstream at different times in order to avoid interference between the upstream signals and the downstream signals.

In a downstream direction, the service unit 25 receives a high-speed data stream from the network 12 via the network line 27 and forwards packets from the high-speed data stream across the plurality of subscriber lines 31-33. In an upstream direction, the service unit 25 receives data streams from the CPE via the subscriber lines 31-33 and transmits packets from such data streams across the network line 27 to the network 12.

In some embodiments, each subscriber line 31-33 comprises at least one twisted-wire pair, and digital subscriber line (DSL) modulation formats are used to communicate data across the subscriber lines 31-33. For illustrative purposes, it will be assumed hereafter unless otherwise indicated that discrete multi-tone (DMT) signals are communicated across each subscriber line 31-33 in accordance with G.fast protocols, but it should be emphasized that other types of modulation formats and protocols may be used in other embodiments.

Figure 2:
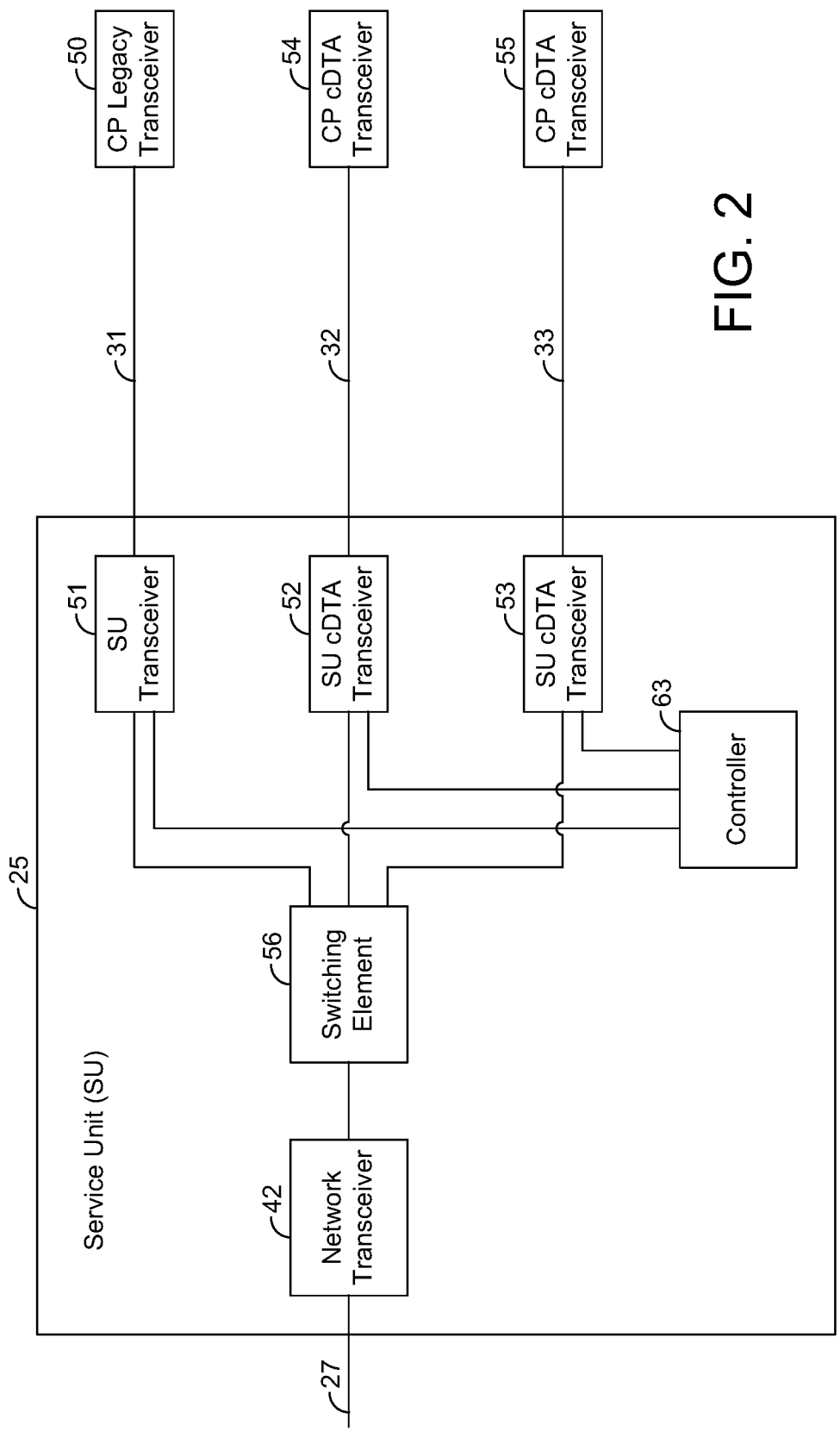
FIG. 2 is a block diagram illustrating an exemplary embodiment of a service unit, such as is depicted by FIG. 1.

FIG. 2 depicts an exemplary embodiment of the service unit (SU) 25. As shown by FIG. 2, the service unit 25 comprises a network transceiver 42 that is coupled to the network line 27 and a plurality of transceivers 51-53 that are respectively coupled to the subscriber lines 31-33. In the exemplary embodiment shown by FIG. 2, the transceiver 51 is coupled to a transceiver 50, referred to hereafter as "CP legacy transceiver," by the subscriber line 31. The CP legacy transceiver 50 is configured to communicate data across the subscriber line 31 using a fixed frame format, as will be described in more detail hereafter.

The transceivers 52-53, referred to hereafter as "SU cDTA transceivers," are coupled to transceivers 54-55, referred to hereafter as "CP cDTA transceivers," via subscriber lines 32-33, respectively. The cDTA transceivers 52-55 communicate data across the subscriber lines 32-33 using cDTA, as will be described in more detail hereafter.

In some embodiments, the SU transceiver 51 may be implemented as the same type as SU cDTA transceivers 52-53. As an example, the SU transceiver 51 may be used to replace a legacy transceiver (not shown in FIG. 1) at the service unit 25 when the SU cDTA transceivers 52-53 are installed as part of rollout of cDTA technology. Thus, the SU transceiver 51 may be capable of communicating according to the cDTA algorithm used for the SU DTA transceivers 52-53 but nevertheless communicate in accordance with the fixed frame format for the CP legacy transceiver 50 in order to be compatible with the CP legacy transceiver. That is, the SU transceiver 51 may be designed to be backwards compatible with legacy transceivers. In other embodiments, it is unnecessary for the SU transceiver 51 to be of the same type as the cDTA transceivers 52-53. As an example, the SU transceiver 51 may be of the same type as the CP legacy transceiver 50, such as may be the case when the SU transceiver 51 is not replaced at the time the cDTA transceivers 52-53 are installed at the service unit 25.

As shown by FIG. 2, a switching element 56 is coupled between the network interface 42 and the SU transceivers 51-53. The switching element 56 may be implemented in hardware or a combination of hardware and software. In one exemplary embodiment, the switching element 56 is implemented as a field-programmable gate array, but other types of switching elements 56 are possible in other embodiments.

In the downstream direction, the network interface 42 receives data packets from the network line 27 and transmits such data packets to the switching element 56, which is configured to forward the data packets to the SU transceivers 51-53 for transmission across the subscriber lines 31-33 based on header information within the data packets using forwarding techniques known in the art. When an SU transceiver 51-53 receives data packets from the switching element 56, the SU transceiver modulates a carrier signal with the data packets to form a data signal that is transmitted across the transceiver's respective subscriber line 31-33.

In the upstream direction, the SU transceivers 51-53 receive modulated data signals from the subscriber lines 31-33. For a given signal received by a given SU transceiver 51-53, the SU transceiver demodulates the received signal to recover data packets. The SU transceiver forwards the data packets to the switching element 56, and the switching element 56 combines the data packets received from all of the SU transceivers 51-53 into a high-speed data stream, which is received by the network transceiver 42 for transmission across the network line 27.

As shown by FIG. 2, each SU transceiver 51-53 is coupled to at least one controller 63 that is configured to perform various functions, as will be described in more detail below. The controller 63 may be implemented as a combination of hardware and software, such as at least one microprocessor or other type of processor programmed with instructions for performing various functions. Other configurations of the controller 63 are possible in other embodiments. As an example, the controller 63 may be implemented as a field programmable gate array (FPGA) or other type hardware as may be desired.

Figure 3:
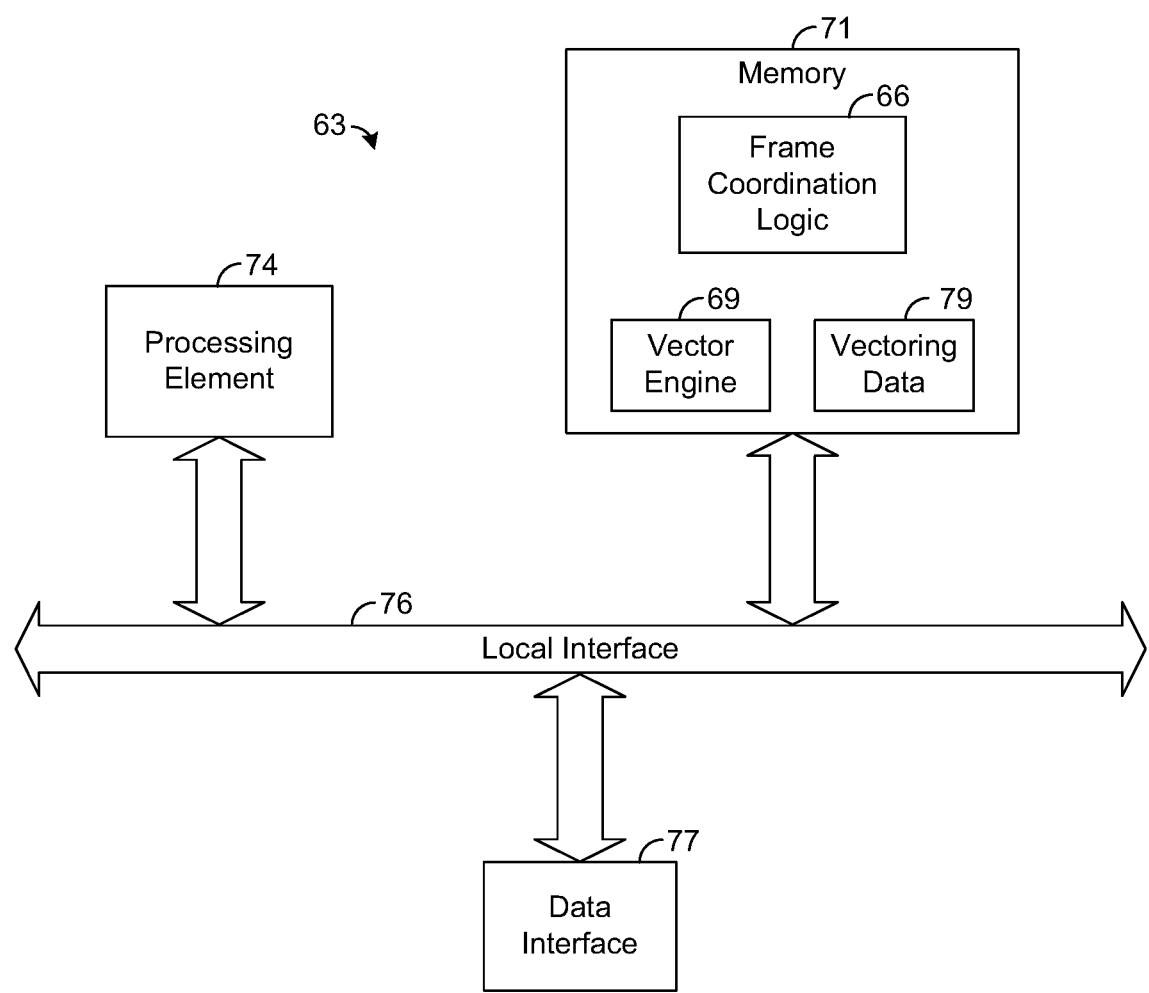
FIG. 3 is a block diagram illustrating an exemplary embodiment of a controller, such as is depicted by FIG. 2.

FIG. 3 depicts an exemplary embodiment of the controller 63. As shown by FIG. 3, the controller 63 may comprise frame coordination logic 66 that is configured to control the allocation of timeslots for the frames communicated by the cDTA transceivers 52-55, as will be described in more detail hereafter. The controller 63 may also comprise a vector engine 69 for performing crosstalk vectoring in order to cancel far-end crosstalk (FEXT) that couples from one subscriber line 31-33 to another, as will be described in more detail below. The frame coordination logic 66 and the vector engine 69 can be implemented in software, hardware, firmware or any combination thereof. In the exemplary controller 63 illustrated by FIG. 3, the frame coordination logic 66 and the vector engine 69 are implemented in software and stored in memory 71 of the controller 63.

The exemplary controller 63 depicted by FIG. 3 comprises at least one conventional processing element 74, such as a digital signal processor (DSP) or a central processing unit (CPU), that communicates to and drives the other elements within the controller 63 via a local interface 76, which can include at least one bus. Furthermore, a data interface 77 permits the controller 63 to receive data from or communicate data to other components of the service unit 25 as may be desired.

As indicated above, the vector engine 69 is configured to cancel FEXT that couples from one subscriber line 31-33 to another. In some embodiments, the vector engine 69 generates and maintains vectoring data 79, which is stored in memory 71, for use in performing crosstalk vectoring. When DMT signals are used, the vectoring data 79 may include vectoring coefficients for the tones transmitted and received by the SU transceivers 51-53. Via known techniques, the vector engine 69 may use such vectoring data 79 to estimate crosstalk that affects the received tones or that will affect tones to be transmitted so that such crosstalk can be cancelled.

For example, the vectoring data 79 may include sets of vectoring coefficients respectively corresponding to the tones communicated across the subscriber lines 31-33. For a given tone, referred to in this example as "victim tone," received by one of the SU transceivers 51-53 from one of the subscriber lines 31-33, the corresponding set of vectoring coefficients includes vectoring coefficients respectively associated with the tones, referred to as "interfering tones," that interfere with the victim tone. Upon receiving a set of symbols simultaneously communicated across the subscriber lines 31-33, the transceivers 51-53 send such symbols to the controller 63. The vector engine 69 combines (e.g., multiplies) the symbol of an interfering tone with the vectoring coefficient associated with such interfering tone and then combines (e.g., subtracts) this result with a victim tone in order to cancel the crosstalk interference from the interfering tone affecting the victim tone. The vector engine 69 performs the same process for the symbols of the other interfering tones in order to cancel, tone-by-tone, crosstalk interference in the victim tone.

The vector engine 69 may use the same techniques to cancel crosstalk from any victim tone received from any subscriber line 31-33 within the same vector group. As known in art, a "vector group" generally refers to a group of subscriber lines for which a vector engine maintains vectoring coefficients so that crosstalk from interfering tones communicated by the vector group can be cancelled. For illustrative purposes, assume that each of the subscriber lines 31-33 are within the same vector group so that the vector engine 69 is capable of cancelling crosstalk that couples from any of the subscriber lines 31-33 to any of the other subscriber lines 31-33.

Note that the vector engine 69 may use techniques similar to those described above in order to precode the symbols transmitted by the SU transceivers 51-53 across the subscriber lines 31-33 such that crosstalk is cancelled as the symbols propagate across the subscriber lines 31-33. Exemplary techniques for performing crosstalk vectoring, including symbol precoding, are described in commonly-assigned U.S. Pat. No. 8,582,425, entitled "Systems and Methods for Cancelling Crosstalk in Satellite Access Devices" and filed on Jan. 28, 2011, which is incorporated herein by reference.

Figure 4:
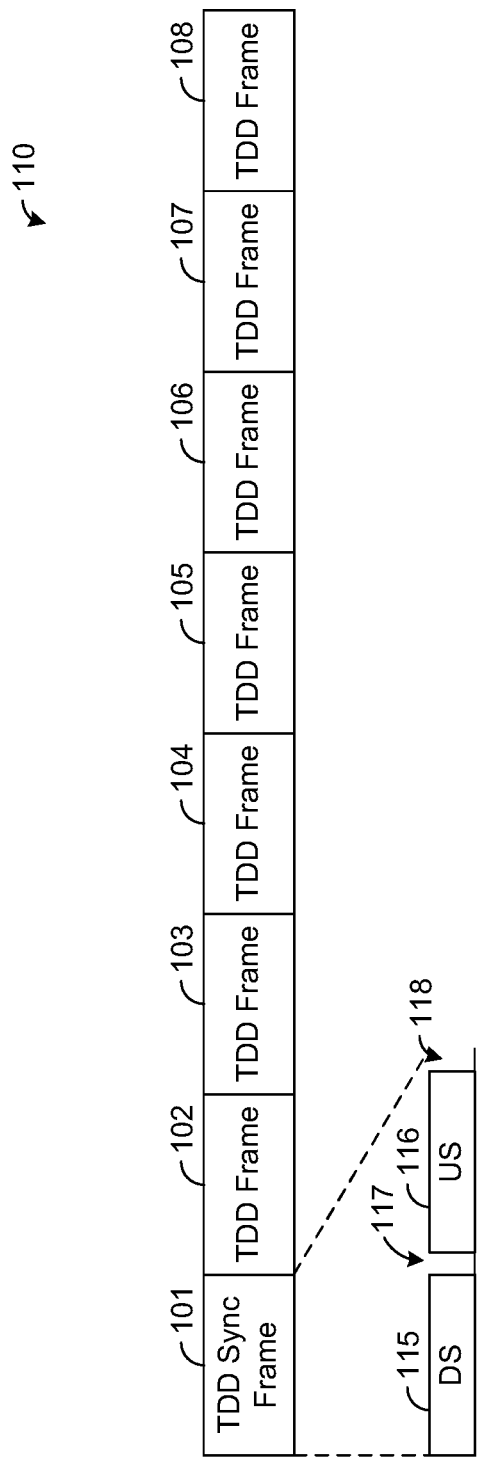
FIG. 4 is a block diagram illustrating an exemplary superframe.

The SU transceivers 51-53 are configured to communicate with the CP transceivers 50, 54-55, respectively, according to one or more desired protocols. In some embodiments, TDD protocols are used where signals are communicated both downstream and upstream at the same frequency and are separated in time in order to avoid interference between the upstream signals and the downstream signals. According to such protocols, the data channel for a given subscriber line 31-33 may be divided into a series of TDD frames 101-108, as shown by FIG. 4. For illustrative purposes, assume that the exemplary frames 101-108 shown by FIG. 4 are in accordance with G.fast protocols, but it should be emphasized that other types of protocols may be employed in other embodiments. In accordance with G.fast, every eight TDD frames 101-108 define a superframe 110 that comprises seven ordinary TDD frames 102-108 and one TTD sync frame 101. The TDD sync frame 101 is distinguishable from the other TDD frames 102-108 of the same superframe 110 in that it includes symbols, referred to as "sync symbols," that are used by the SU transceiver 51-53 and the corresponding CP transceiver 50, 54-55 in order to maintain synchronization and carries vectoring sequences that may be used to update the vectoring coefficients in the vectoring data 79. As will be described in more detail hereafter, there is usually one downstream sync symbol and one upstream sync symbol in each TDD sync frame 101.

As shown by FIG. 4, each frame 101-108 (including both TDD frames 102-107 and the TDD sync frame 101) has a group 115 of downstream (DS) timeslots dedicated for downstream transmissions and a group 116 of upstream (US) timeslots dedicated for upstream transmissions. There is usually a small gap 117 between the DS group 115 and US group 116 to help ensure adequate separation within a desired margin between the downstream group 115 and the upstream group 116. For similar reasons, there is also usually a small gap 118 between the US group 116 and the DS group 115 of the next frame.

Figure 5:
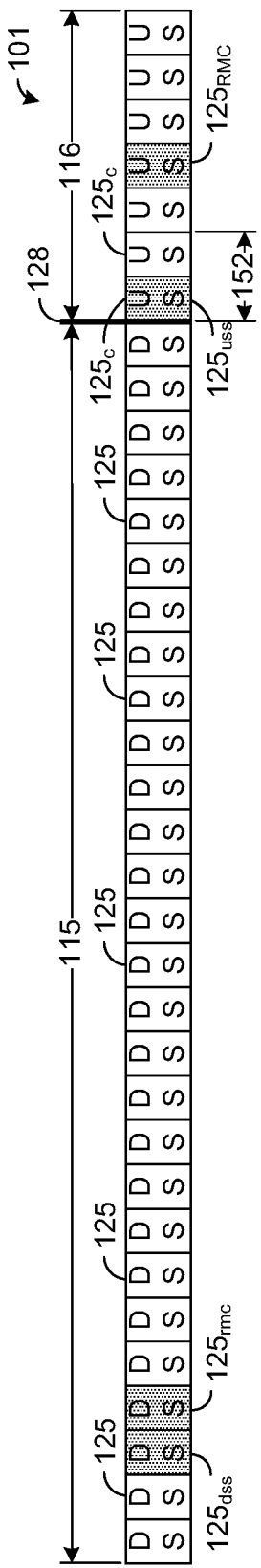
FIG. 5 a block diagram illustrating an exemplary frame configuration for a time-division duplex (TDD) sync frame.

FIG. 5 shows an exemplary TDD sync frame 101. The TDD sync frame 101 has a predefined number timeslots 125 that can be allocated for downstream or upstream transmission. The exemplary frame 101 of FIG. 5 has thirty-five timeslots, but the frame 101 may have any number of timeslots 125 in other embodiments. As shown by FIG. 5, the frame 101 has a group 115 of timeslots 125 allocated for downstream transmissions (labeled as "DS"), and a group 116 of timeslots 125 allocated for upstream transmissions (labeled as "US"). During the DS timeslots 125 of the group 115, a given SU transceiver 51-53 operates in a transmit mode for transmitting across its subscriber line, and the corresponding CP transceiver at the other end of the subscriber line operates in a receive mode for receiving from the subscriber line. During the US timeslots 125 of the group 116, the SU transceiver operates in a receive mode for receiving from the subscriber line, and the corresponding CP transceiver operates in a transmit mode for transmitting across the subscriber line.

A DS/US transition 128 exists between the downstream group 115 and the upstream group 116. During the DS/US transition 128, the SU transceiver transitions from the transmit mode to the receive mode, thereby affecting the impedance applied to the subscriber line by such SU transceiver, and the CP transceiver transitions from the receive mode to the transmit mode, thereby affecting the impedance applied to the subscriber line by such CP transceiver.

One of the DS timeslots (having reference numeral "$125_{dss}$"), referred to hereafter as the "DSS timeslot," is for a downstream sync symbol ("DSS"). Such sync symbol has a predefined value that is known by both the SU transceiver and its corresponding CP transceiver 21-23 that is coupled to the same subscriber line. Based on the DS sync symbol, the CP transceiver is configured to adjust its timing so that it remains synchronized with the SU transceiver. According to G.fast protocol, the DS sync symbol occupies the same DS timeslot (e.g., the third DS timeslot) of each TDD sync frame 101, though it is possible for the DS sync symbol to occupy different timeslots in other embodiments. Through techniques known in the art, the DS sync symbol may also be used to estimate crosstalk and update the downstream vectoring coefficients stored in the vectoring data 79 at the service unit 25.

One of the US timeslots (having reference numeral "$125_{USS}$") referred to hereafter as the "USS timeslot," is for an upstream sync symbol ("USS"). Such sync symbol has a predefined value that is known by both the SU transceiver and the CP transceiver that is coupled to the same subscriber line. The SU transceiver is configured to adjust its timing based on the US synch symbol so that it remains synchronized with the CP transceiver. According to G.fast protocol, the US sync symbol occupies the same frame position of the US group 116 (e.g., the first upstream timeslot following the DS/US transition 128) for each TDD sync frame 101, though it is possible for the DS sync symbol to occupy different timeslots in other embodiments.

Note that the US sync symbol may be used by the vector engine 69 to update the vectoring coefficients stored in the vectoring data 79. In this regard, as indicated above, the US sync symbol is predefined and known by the SU transceiver 51-53 that receives it from the subscriber line. The US sync symbol may be modulated with one or more vectoring sequences that are used by the vector engine 69 to update the vectoring coefficients in the vectoring data 79 according to techniques known in the art. In this regard, based on the received vectoring sequences, the vector engine 69 may estimate an amount of error introduced by crosstalk affecting the US sync symbol. Using such estimate, the vector engine 69 may update the vectoring coefficients so that they provide a better estimation of crosstalk as conditions on the subscriber lines 31-33 change. In other embodiments, other techniques for updating the vectoring coefficients are possible.

One of the DS timeslots 125 (having reference numeral "$125_{RMC}$"), referred to hereafter as the "downstream control timeslot," is used to transmit control information downstream to the corresponding CP transceiver that is coupled to the same subscriber line, and one of the US time slots (having reference numeral "$125_{RMC}$"), referred to hereafter as "upstream control timeslot," is used to transmit control information upstream to the SU transceiver. That is, these downstream and upstream control timeslots $125_{RMC}$ define a control channel, referred to as "robust management channel (RMC)" in G.fast, embedded in the frame protocol used to transmit information across the subscriber line. Various information may be communicated in the control channel. As an example, in the upstream direction, the CP transceiver may transmit control information indicative of traffic load conditions at the CP transceiver. Such information may be used in dynamically allocating timeslots for future frames, as will be described in more detail below. In the downstream direction, information indicative of the frame configuration, including allocation of upstream and downstream timeslots, may be communicated in the downstream control timeslot $125_{RMC}$.

For subscriber lines 32-33 coupled to cDTA transceivers 52-55, the frame coordination logic 66 may be configured to dynamically allocate timeslots based on current load conditions. For example, the frame coordination logic 66 may communicate with the SU cDTA transceivers 52-53 to determine downstream traffic load conditions at the service unit 25 for subscriber lines 32-33, and the frame coordination logic 66 may communicate with the CP cDTA transceivers 54-55 via the control channel embedded in frame protocol or otherwise to determine upstream traffic load conditions at the CPE 15 for subscriber lines 32-33. The frame coordination logic 66 may then allocate upstream and downstream capacity depending on the current traffic load conditions.

In this regard, for each frame, the frame coordination logic 66 may embed in the downstream control timeslot $125_{RMC}$ timeslot control information indicating which timeslots 125 are allocated for downstream transmission and which timeslots 125 are allocated for upstream transmission. The cDTA transceivers 52-55 communicate for the remainder of the frame according to the control information provided by the frame coordination logic 66. Thus, the frame coordination logic 66 can dynamically change the number of timeslots that are allocated for downstream transmission and the number of timeslots that are allocated for upstream transmission.

Figure 6:
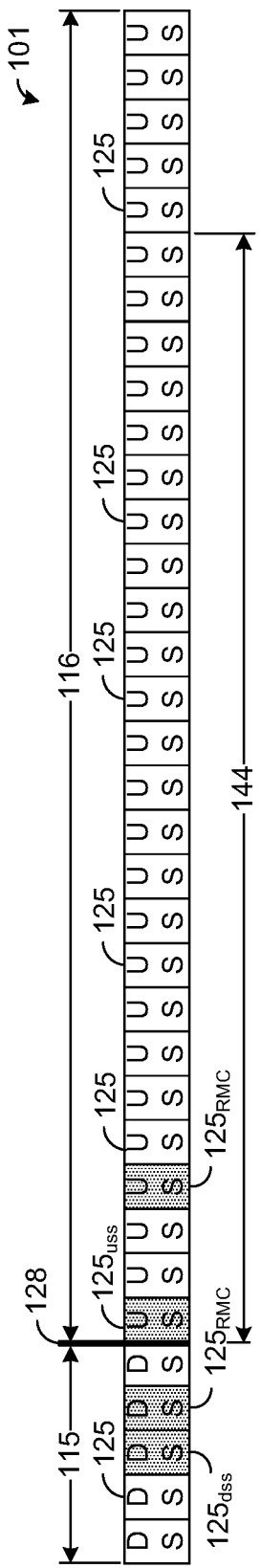
FIG. 6 is a block diagram illustrating an exemplary frame configuration for a TDD sync frame to provide maximum upstream capacity according to at least some protocols, such as G.fast.

As an example, if there is a relatively large amount of data to transmit upstream across the subscriber lines 32-33 and a relatively small amount of data to transmit downstream across the subscriber lines 32-33, the frame coordination logic 66 may allocate more upstream capacity by allocating a greater number of timeslots 125 for upstream transmissions and a lesser number of timeslots 125 for downstream transmissions. FIG. 6 shows an exemplary frame 101 when the frame coordination logic 66 has allocated a maximum number of timeslots 125 for upstream transmissions according to G.fast protocols.

Figure 7:
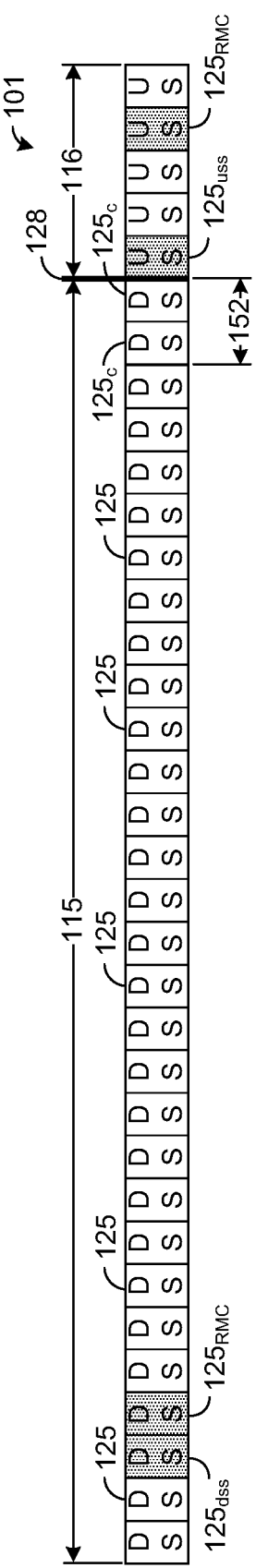
FIG. 7 is a block diagram illustrating an exemplary frame configuration for a TDD sync frame to provide maximum downstream capacity according to at least some protocols, such as G.fast.

On the other hand, if there is a relatively large amount of data to transmit downstream and a relatively small amount of data to transmit upstream, the frame coordination logic 66 may allocate more downstream capacity by allocating a greater number of timeslots 125 for downstream transmissions and a lesser number of timeslots 125 for upstream transmissions. FIG. 7 shows an exemplary frame 101 when the frame coordination logic 66 has allocated a maximum number of timeslots 125 for downstream transmissions according to G.fast protocols.

Note that there are various techniques that may be used to indicate the allocation of downstream timeslots and upstream timeslots for a frame in the control information passed between transceivers. As an example, in some embodiments, the downstream control timeslot $125_{RMC}$ may define a value that specifies the number of downstream timeslots that follow the in the frame. Based on such value, the CP transceiver that receives the control information can determine when the transition from downstream to upstream occurs and thus determine which timeslots are allocated for downstream and which timeslots are allocated for upstream. In other embodiments, other techniques can be used.

In some embodiments, the frame coordination logic 66 is configured to coordinate the allocation of timeslots for all of the cDTA transceivers 52-55 in the same binder so that each such cDTA transceiver communicates according to the same frame configuration. That is, the DS/US transition 128 is at the same point in the frame (i.e., same frame position) for all of the cDTA transceivers 52 and 53 so that they transmit downstream (i.e., are in the transmit mode) at the same time and receive upstream (i.e., are in the receive mode) at the same time thereby avoiding the introduction of significant levels of NEXT for the subscriber lines 32-33 coupled to the cDTA transceivers 52-53. Specifically, both SU cDTA transceivers 52-53 are in the transmit mode and the corresponding CP cDTA transceivers 54-55 are in the receive mode for the timeslots 125 of the group 115 allocated for downstream transmissions, and both SU cDTA transceivers 52-53 are in the receive mode and the corresponding CP cDTA transceivers 54-55 are in the transmit mode for the timeslots 125 of the group 116 allocated for upstream transmissions.

The transceivers 50-51, however, may be configured to communicate according to a fixed frame format. That is, the protocol used by the transceivers 50-51 for communication across the subscriber line 31 may not define a way for information to be embedded in the control channel to instruct the CP legacy transceiver 50 to change the allocation of upstream and downstream capacity. Thus, after provisioning of the transceivers 50-51, the frame coordination logic 66 may be unable to change the allocation of upstream and downstream timeslots for both transceivers 50-51. That is, for each frame, the location of the DS/US transition 128 may remain at the same location in the frame. As the allocation of upstream and downstream timeslots for the cDTA transceivers 52-55 dynamically changes, it is likely that the transceivers 50-51, for at least a portion of the frame, will be in a mode for communicating in a different direction relative to the cDTA transceivers 52-55.

As an example, assume that the transceivers 50-51 are configured to communicate according to the frame configuration shown by FIG. 7 and that the frame coordination logic 66 dynamically allocates upstream and downstream capacity so that the cDTA transceivers 52-55 communicate according to the frame configuration shown by FIG. 6. In such an example, for a portion 144 (FIG. 6) of the frame from the DS/US transition 128 of FIG. 6 to the DS/US transition 128 of FIG. 7, there is a discrepancy in the communication directions of the cDTA transceivers 52-55 relative to the transceivers 50-51. Specifically, in this frame portion 144, SU cDTA transceivers 52-53 are in the receive mode and the corresponding CP cDTA transceivers 54-55 are in the transmit mode while the SU transceiver 51 is the transmit mode and the corresponding CP legacy transceiver 50 is in the receive mode. That is, the cDTA transceivers 52-55 are configured for upstream transmissions while the transceivers 50-51 are configured for downstream transmissions. If the SU transceiver 51 attempts to communicate data downstream during this frame portion 144 while either of the CP cDTA transceivers 54 or 55 is attempting to communicate data upstream, significant levels of NEXT will likely interfere with at least the upstream transmissions.

Figure 8:
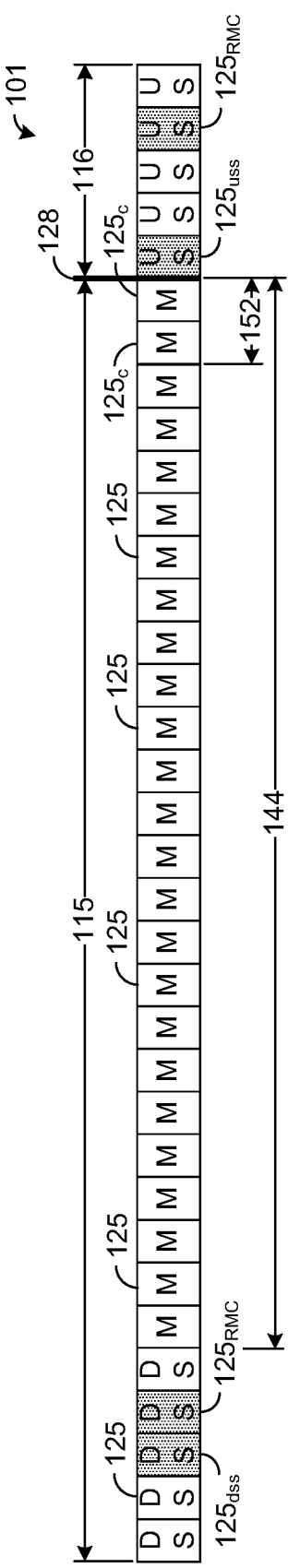
FIG. 8 is a block diagram illustrating an exemplary frame configuration for legacy transceivers in accordance with the present disclosure.

In some embodiments, the frame coordination logic 66 is configured reduce such NEXT by muting timeslots 125 of the transceivers 50-51 within the frame where there is a difference in the direction of communication for the transceivers 50-51 relative to that for the cDTA transceivers 52-55. In this regard, the protocol of the transceivers 50-51 may permit such transceivers 50-51 to communicate control information for muting one or more timeslots 125. As an example, the format of the symbol for the downstream control timeslot $125_{RMC}$ may be defined to indicate which of the timeslots 125 are muted. When a timeslot 125 is muted, the transceivers 50-51 are precluded from transmitting data in the muted timeslot 125. FIG. 8 shows the exemplary frame configuration of FIG. 5 where the downstream timeslots muted by the frame coordination logic 66 are designated "M". Since the timeslots 125 within the frame portion 144 are muted for the transceivers 50-51, the frame coordination logic 66 may move the DS/US transition 128 for the cDTA transceivers 52-55 to any position within the frame portion 144 while still avoiding significant amounts of NEXT.

To better illustrate the foregoing, assume that, based on dynamic load conditions, the frame coordination logic 66 dynamically allocates upstream and downstream timeslots according to FIG. 5 for the cDTA transceivers 52-55. In such an embodiment, during a portion 152 (FIG. 7) of the frame 101 for the transceivers 50-51, there is a conflict in communication direction between the subscriber line 31 and the subscriber lines 32-23. Specifically, during the frame portion 152, the cDTA transceivers 52-55 are in modes for upstream transmissions (i.e., the SU cDTA transceivers 52-53 are in the receive mode and the CP cDTA transceivers 54-55 are in the transmit mode) and the transceivers 50-51 are in modes for downstream transmissions (i.e., the SU transceiver 51 is in the transmit mode and the CP legacy transceiver 50 is in the receive mode). However, since at least the timeslots in the frame portion 152 for the transceivers 50-51 are muted, no data is transmitted across the subscriber line 31 in at least the frame portion 152, thereby decreasing the amount of crosstalk that couples from the subscriber line 31 to the subscriber lines 32-33 during the period that there is conflict in the communication directions between the transceivers 50-51 and the cDTA transceivers 52-55.

Note that similar effects can be realized regardless of where the DS/US transition 128 is positioned within the frame portion 144 such that the DS/US transition 128 can be moved for the cDTA transceivers 52-55 to any point within the frame portion 144 without introducing significant levels of crosstalk. As an example, the DS/US transition 128 could be moved to the point shown by FIG. 6 for the cDTA transceivers 52-55 in order to provide more upstream capacity without the differences in communication directions between transceivers 50-51 and cDTA transceivers 52-55 causing the introduction of significant levels of crosstalk.

Moreover, muting the timeslots 125 of frame portion 144 for the transceivers 50-51, as shown by FIG. 8, has the benefit of reducing crosstalk so that the transceivers 50-51 are more compatible with the dynamic time assignment for the cDTA transceivers 52-55, though such benefit does come at a cost of reducing the rate that the transceivers 50-51 are capable of communicating data across the subscriber line 31. By reducing the effects of crosstalk, particularly NEXT, as described above, it is possible to couple cDTA transceivers to subscriber lines bound by the same binder as subscriber lines coupled to legacy transceivers using fixed frame formats without introducing unacceptable levels of crosstalk.

Note that it is unnecessary for the frame coordination logic 66 to mute the entire frame portion 144 in all cases. In this regard, the frame coordination logic 66 may be configured to dynamically change the selection of which timeslots 125 to mute for the transceivers 50-51 based on the dynamic upstream and downstream allocation of timeslots 125 for the cDTA transceivers 52-55. Specifically, for the effect of avoiding significant introduction of NEXT, the frame coordination logic 66 may be configured to mute each timeslot 125, referred to hereafter as a "conflicting timeslot $125_c$," for the transceivers 50-51 that is in the opposite direction relative to the direction of a timeslot 125 at the same frame position (referred to hereafter as "overlapping timeslot") for the cDTA transceivers 52-55.

Figure 9:
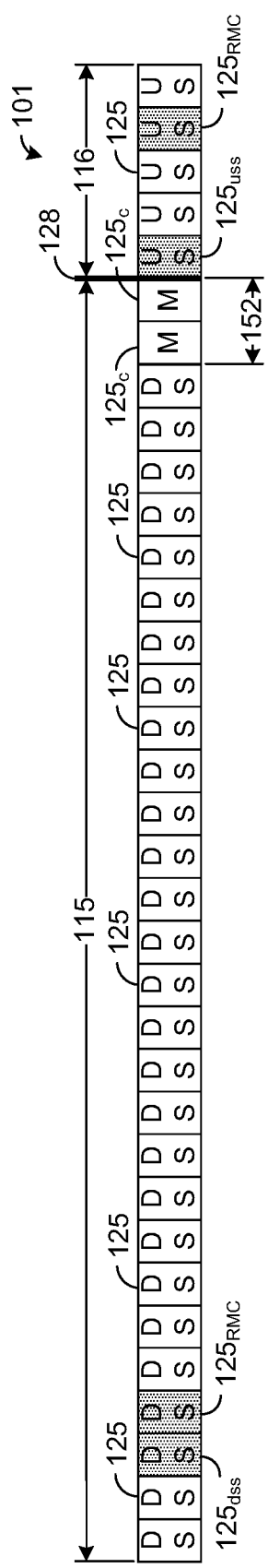
FIG. 9 is a block diagram illustrating an exemplary frame configuration for legacy transceivers in accordance with the present disclosure.

For example, in the example described above where the transceivers 50-51 are configured to communicate according to the frame configuration shown by FIG. 7 and the frame configuration logic 66 selects the frame configuration shown by FIG. 5 for the cDTA transceivers 52-55, only two timeslots (i.e., the timeslots $125_c$ within frame portion 152) are conflicting (i.e., in a direction for the transceivers 50-51 that is different than the two overlapping timeslots $125_c$ for the cDTA transceivers 52-55). In such an example, for the transceivers 50-51, the frame configuration logic 66 may select only the two conflicting timeslots $125_c$ in the frame portion 152 for muting, as shown by FIG. 9. As can be seen by comparing FIGS. 5 and 9, each of the remaining timeslots 125 in the frame for the transceivers 50-51 is in the same directions as its respective overlapping timeslot for the cDTA transceivers 52-55. Thus, allowing the remaining timeslots 125 to be filled with data should not introduce significant levels of NEXT.

As described above, the protocol used by the transceivers 50-51 may not permit control information to be communicated to the CP legacy transceiver 50 to dynamically change or otherwise select a direction of a timeslot 125. Thus, conflicting timeslots are muted in an effort to avoid introduction of significant levels of crosstalk, as described above. Even though the conflicting timeslots are muted and, thus, are not filled with data, the existence of the conflicting timeslots may nevertheless adversely affect the vectoring operations that are performed by the vector engine 69 due to the impedances applied to the subscriber line 31 by the transceivers 50-51. In this regard, the vectoring coefficients learned by the vector engine 69 and stored in the vectoring data 79 are at least slightly affected by the relative line impedances of the subscriber lines in the same vectoring group. Thus, any change in line impedance of one subscriber line relative to the line impedance of another subscriber line may degrade vectoring performance unless and until the vectoring coefficients are appropriately updated to account for the impedance change.

Further, as known in the art, the vectoring coefficients in the vectoring data 79 used by the vector engine 69 may be updated based on symbols communicated across the subscriber lines 31-33. Specifically, the vectoring data 79 may define a set of downstream vectoring coefficients that are used for downstream transmissions and a set of upstream vectoring coefficients that are used for upstream transmissions. The downstream coefficients may be updated based on symbols communicated downstream across the subscriber lines 31-33, and the upstream coefficients may be updated based on symbols communicated upstream across the subscriber lines 31-33. As an example, as described above, the downstream vectoring coefficients may be updated based on the downstream sync symbol communicated in the DSS timeslot $125_{dss}$ of the TTD sync frame 101, and the upstream coefficients may be updated based on the upstream sync symbol communicated in the USS timeslot $125_{uss}$ of the TDD sync frame 101. In other embodiments, the vectoring coefficients may be updated based on other symbols.

For conflicting timeslots $125_c$, the transceivers 50-51 are in different modes relative to the cDTA transceivers 52-55. As an example, for the conflicting timeslots $125_c$ shown by FIG. 9, the CP legacy transceiver 50 is in the transmit mode and the SU transceiver 51 is in the receive mode. However, the CP cDTA transceivers 54-55 are in the receive mode and the SU cDTA transceivers 52-53 are in the transmit mode. Because the transceivers 50-51 are in different modes relative to the cDTA transceivers 52-55, the transceivers 50-51 apply different impedances than the ones they applied for training the vectoring coefficients being used for cancelling crosstalk from the symbols communicated by the cDTA transceivers 52-55. Specifically, the transceivers 50-51 apply different impedances to the subscriber line 31 relative to the impedances that they applied to the subscriber line 31 when the upstream sync symbol was last communicated. This different line impedance for the subscriber line 31 is likely to affect the effectiveness of the vectoring operations in an adverse manner during the conflicting timeslots $125_c$ in the frame portion 152.

In some embodiments, the frame coordination logic 66 is configured to mitigate this adverse effect to the vectoring operations by controlling the mode of the SU transceiver 51 based on the allocation of upstream and downstream timeslots 125 for the cDTA transceivers 52-55. In this regard, for conflicting timeslots $125_c$, the frame coordination logic 66 is configured to control the SU transceiver 51 to put it in a mode for communication in the same direction as the cDTA transceivers 52-53. As an example, in the embodiment described above where the transceiver 50 is provisioned to communicate according to the frame configuration shown by FIG. 7 and the cDTA transceivers 52-55 are controlled to communicate according to the frame configuration of FIG. 5, the conflicting timeslots $125_c$ are upstream for the cDTA transceivers 52-55 and downstream for the transceivers 50-51. As described above, such conflicting timeslots $125_c$ are preferably muted for the transceivers 50-51 in order to reduce NEXT, as shown by FIG. 9. In the instant example, the frame coordination logic 66 may also be configured to control the SU transceiver 51 such that it transitions to the receive mode during the conflicting timeslots $125_c$ of the frame portion 152 (i.e., at the same time that the SU cDTA transceivers 52-53 transition to the receive mode) even though the transition is scheduled for a different time according to the frame configuration for the transceivers 50-51 shown by FIG. 7. The CP legacy transceiver 50 will remain in the receive mode during the conflicting timeslots $125_c$ since it has been provisioned to transition to the transmit mode at the DS/US transition 128 according to the frame configuration shown by FIG. 7. Therefore, during the conflicting timeslots 125$_c$ of the frame portion 152, both of the transceivers 50-51 may be in the same mode (i.e., the receive mode in the current example). However, noting that the conflicting timeslots 125$_c$ are muted for the transceivers 50-51, as shown by FIG. 9, no data is communicated across the subscriber line 31 during the conflicting timeslots 125$_c$, and having both transceivers 50-51 in the same mode of operation for these timeslots 125$_c$ should not cause any data errors. Further, since the SU legacy transceiver 51 is in the receive mode (i.e., the same mode of operation for this transceiver 51 when the upstream vectoring coefficients were last updated), it should apply an impedance to the line 31 during the frame portion 152 that is better matched to the upstream vectoring coefficients being used to cancel crosstalk for the symbols communicated by the cDTA transceivers 52-55 such that vectoring performance may be improved for the symbols communicated by the cDTA transceivers 52-55 in the conflicting timeslots 125$_c$.

Note that, in the above examples, the frame configurations are illustrated such that downstream timeslots 125 occur prior to upstream timeslots. However, it is possible for upstream timeslots to occur prior to downstream timeslots in other embodiments. It is also possible for downstream timeslots for the transceivers 50-51 to be muted for avoiding NEXT instead of upstream timeslots, such as when upstream timeslots occur before downstream timeslots. Yet other frame configurations and techniques for avoiding crosstalk are possible in other embodiments. In addition, in the above examples, various allocations of timeslots are illustrated using the TDD sync frame 101. The other TDD frames 102-108 may be controlled according to the same techniques described above in order to avoid compatibility issues related to NEXT.

For some embodiments, the vector engine 69 may update the vectoring coefficients in the vectoring data 79 based on symbols communicated in certain timeslots. As an example, as described above, the vector engine 69 may use the upstream sync symbols to estimate crosstalk in the upstream direction and then update the upstream vectoring coefficients in the vectoring data 79 based on the estimated crosstalk. Similarly, the downstream sync symbols may be used to estimate crosstalk in the downstream direction and then the downstream vectoring coefficients in the vectoring data 79 may be updated based on the estimated downstream crosstalk. Normally, it is expected that all sync symbols for a vectoring coefficient update (e.g., an update to downstream vectoring coefficients or to upstream vectoring coefficients) will be communicated across the subscriber lines at the same time. However, use of cDTA may change the timing of at least some sync symbols, thereby creating problems in performing crosstalk estimations for vectoring coefficient updates in the vectoring data 79.

As an example, assume that, according to the protocols used by the legacy and cDTA transceivers 50-55, the downstream sync symbol is to be transmitted downstream in the third timeslot (i.e., the DSS timeslot 125$_{dss}$) of the TDD sync frame 101, as shown by FIGS. 5 and 9, for both legacy transceivers and cDTA transceivers, and assume that the upstream sync symbol is to be transmitted upstream in the first timeslot (i.e., the USS timeslot 125$_{uss}$) after the DS/US transition 128, as shown by FIGS. 5 and 9, for both legacy transceivers and cDTA transceivers. However, since the frame position of the DS/US transition 128 is dynamically moved for the cDTA transceivers 52-55 by the frame coordination logic 66, the upstream sync symbols for the cDTA transceivers 52-53 are likely to be communicated at a different time (i.e., in timeslots at different frame positions) than the upstream sync symbols for transceivers 50-51.

For the USS timeslot 125$_{uss}$ for the upstream sync symbol in the exemplary frame configuration that is shown by FIG. 5 and used by the cDTA transceivers 52-55, the overlapping timeslot (i.e., the timeslot at the same frame position) in the frame configuration that is shown by FIG. 9 and used by the transceivers 50-51 is muted. Thus, no data is transmitted by the transceivers 50-51 when the upstream sync symbols transmitted by the CP cDTA transceivers 54-55 are propagating along the subscriber lines 32-33. In such case, any signal that is present on the subscriber line 31 is from crosstalk that couples to such subscriber line 31 from the subscriber lines 32-33 of cDTA transceivers in the same binder. Thus, based on the signal measurement by the SU transceiver 51 at the time that the upstream sync symbols are received by the SU cDTA transceivers 52-53, the vector engine 69 may estimate the amount of crosstalk from symbols communicated by cDTA transceivers 54-55 that affect symbols received by the SU transceiver 51. If there are more subscriber lines for more cDTA transceivers in the same binder, similar techniques may be used to estimate crosstalk from all such subscriber lines.

However, for the USS timeslot 125$_{uss}$ for the upstream sync symbol in the exemplary frame configuration that is shown by FIG. 9 and used by the transceivers 50-51, the overlapping timeslot in the frame configuration shown by FIG. 5 and used by the legacy cDTA transceivers 52-55 is an upstream timeslot that could be used for a data symbol. Thus, the same techniques described above for estimating crosstalk from the cDTA transceivers 54-55 may not be applicable for estimating the crosstalk from the transceivers 50-51 affecting upstream symbols. There are several ways that the crosstalk from the transceivers 50-51 affecting upstream symbols received by the SU cDTA transceivers 52-53 can be estimated.

Figure 10:
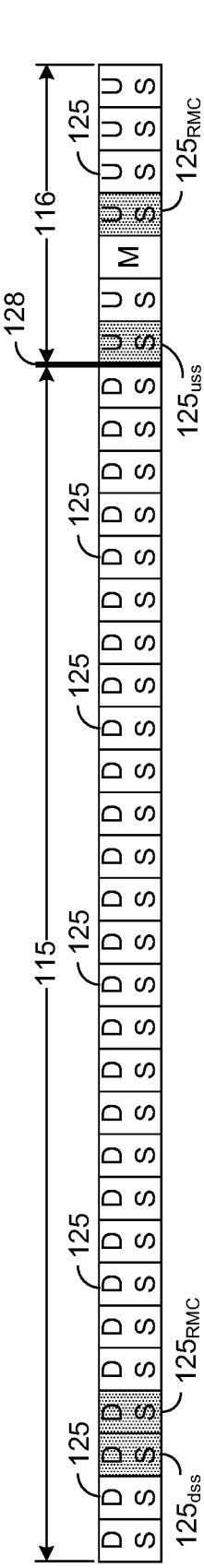
FIG. 10 is a block diagram illustrating an exemplary frame configuration for cDTA transceivers in accordance with the present disclosure.

One exemplary approach is depicted by the exemplary frame configuration of FIG. 10. In this regard, for the cDTA transceivers 52-55, the frame coordination logic 66 may be configured to mute the timeslot 125 that overlaps with (i.e., is at the same frame position) as the USS timeslot 125$_{uss}$ for the upstream sync symbol transmitted by the CP legacy transceiver 50, as can be seen by comparing FIGS. 9 and 10. Thus, no data is transmitted by the cDTA transceivers 52-55 when the upstream sync symbol transmitted by the CP legacy transceiver 50 is propagating along the subscriber line 31. In such case, any signal that is present on either subscriber line 32 or 33 is from crosstalk that couples from the subscriber line 31 of the legacy CP transceiver 50 to the subscriber line 32 or 33. Thus, based on the signal measurement by a cDTA transceiver 52 or 53 at the time that the upstream sync symbol is received by the SU legacy transceiver 50, the vector engine 69 may estimate the amount of crosstalk from symbols communicated by the CP legacy transceiver 50 that affects data symbols received by the cDTA transceiver 52 or 53. If there are more subscriber lines for more legacy transceivers in the same binder, similar techniques may be used to estimate crosstalk from all such subscriber lines.

In some embodiments, it is unnecessary for the frame coordination logic 66 to mute the timeslot 125 for the cDTA transceivers that overlaps the USS timeslot 125$_{uss}$ for the upstream sync symbol transmitted by the CP legacy transceiver 50. As an example, the CP cDTA transceivers 54-55 may be allowed to transmit data in such overlapping timeslot. In such embodiment, a respective data symbol may be propagating along each subscriber line 32 and 33 while the upstream sync symbol transmitted by the CP legacy transceiver 50 is propagating along the subscriber line 31. Conventional techniques exist for estimating the amount of crosstalk affecting a data symbol communicated along a subscriber line. Generally, these techniques often involve decoding the data symbol after reception and estimating an error for the decoded data symbol. When the original data symbol is unknown by the receiving transceiver, the techniques for estimating error and, hence, crosstalk are generally less accurate relative techniques that estimate error and crosstalk using a predefined symbol, such as a sync symbol, where the transmitted symbol is known by the receiving transceiver.

Figure 11:
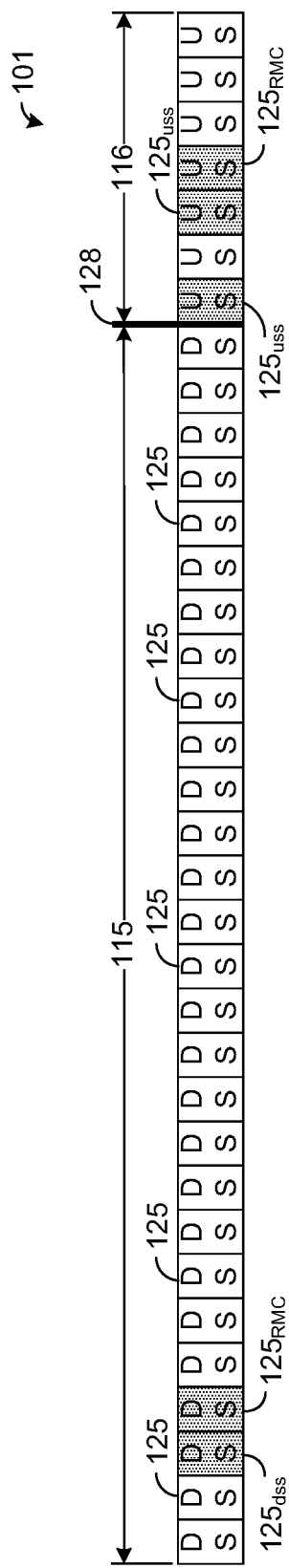
FIG. 11 is a block diagram illustrating an exemplary frame configuration for cDTA transceivers in accordance with the present disclosure.

In another embodiment, it is possible for the frame coordination logic 66 to control each CP cDTA transceiver 54-55 to transmit a duplicate of its respective upstream sync symbol (or other predefined symbol) in the timeslot that overlaps the USS timeslot $125_{uss}$ for the upstream sync symbol transmitted by the CP legacy transceiver 50, as shown by FIG. 11. Thus, if a duplicate of the upstream sync symbol is transmitted as shown by FIG. 11, each CP cDTA transceiver 54-55 transmits its respective upstream sync symbol in the first timeslot after the DS/US transition 128 and then also two timeslots later when the CP legacy transceiver 50 transmits its upstream sync symbol. Therefore, upstream sync symbols propagate along each subscriber line 31-33 at the same time for the USS timeslot $125_{uss}$ of FIG. 9 for the transceivers 50-51 and may be used by the vector engine 69 to estimate crosstalk. Since each of the sync symbols is predefined, a more accurate estimate of crosstalk that couples from the subscriber lines 32 and 33 of the cDTA transceivers 52-55 to the subscriber line 31 of the transceivers 50-51 is likely more accurate than the embodiment described above where the crosstalk estimate is based on data symbols transmitted by the CP cDTA transceivers 54-55.

An exemplary use and operation of the TDD system 36 will now be described in more detail below with reference to FIG. 12.

Figure 12:
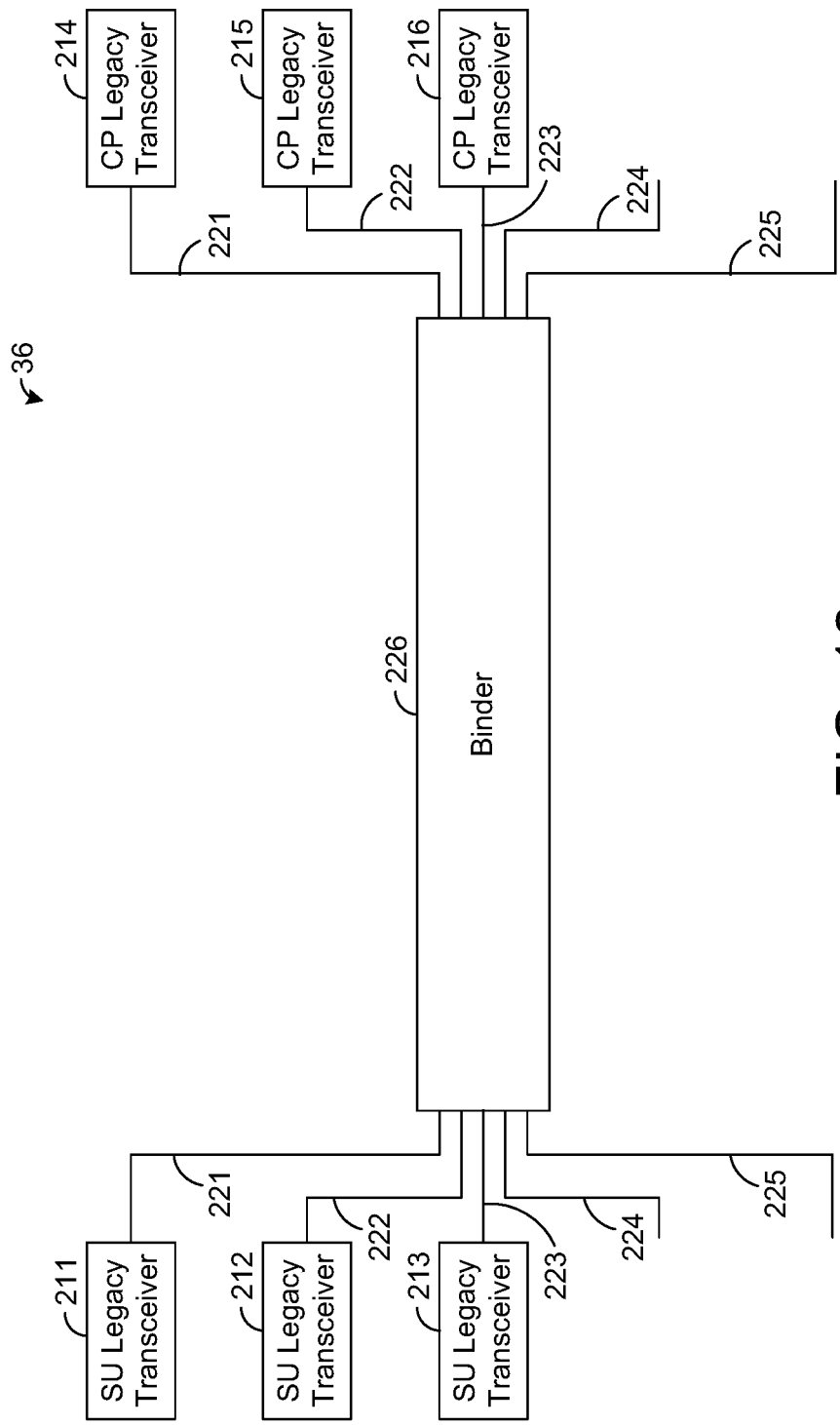
FIG. 12 is a block diagram illustrating an exemplary embodiment of a TDD system.
Figure 13:
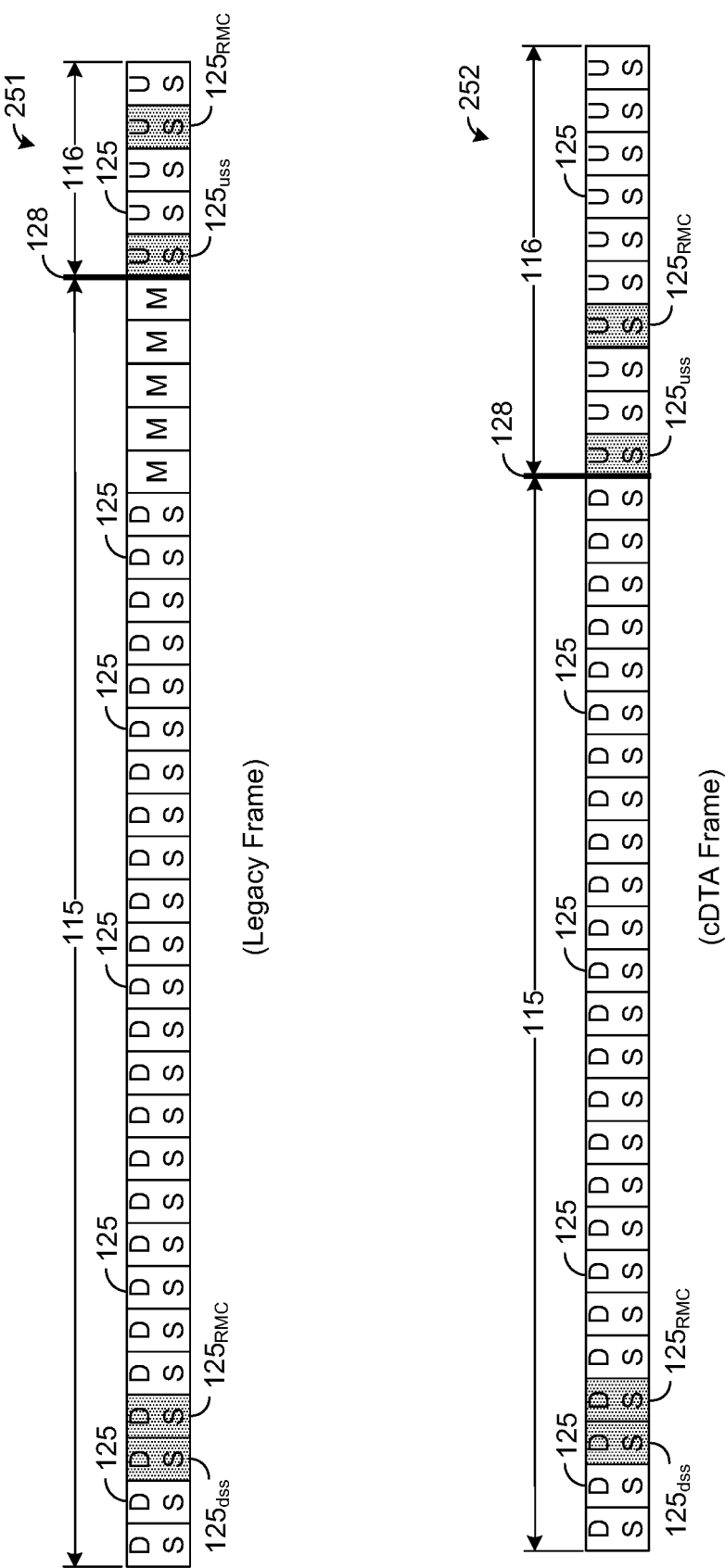
FIG. 13 is a block diagram illustrating exemplary frame configurations for legacy transceivers and cDTA transceivers in accordance with the present disclosure.

For illustrative purposes, assume that the TDD system 36 has a plurality of SU legacy transceivers 211-213 coupled to a plurality of CP legacy transceivers 214-216 by a plurality of subscriber lines 221-223 bound within the same binder 226, as shown by FIG. 12. Further assume that each of these legacy transceivers 211-216 is provisioned to communicate according to a fixed frame format, which is illustrated by the exemplary frame 251 shown by FIG. 13. As shown by FIG. 13, the legacy transceivers 211-216 are provisioned to communicate downstream up to the DS/US transition 128 and to thereafter communicate upstream.

Figure 14:
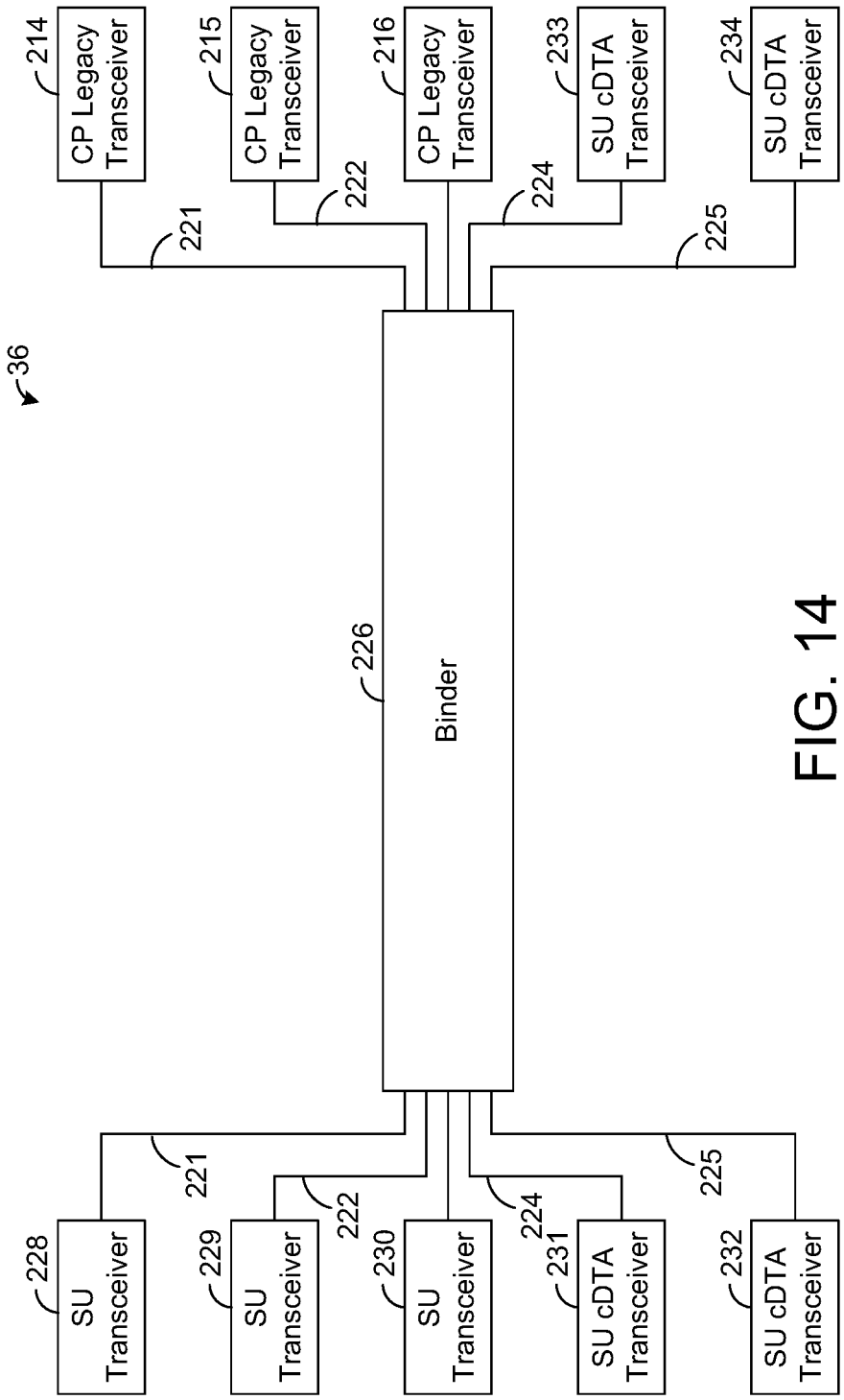
FIG. 14 is a block diagram illustrating an exemplary embodiment of the TDD system of FIG. 12 after cDTA transceivers have been coupled to subscriber lines.

Referring to FIG. 12, the binder 226 may also bind other subscriber lines 224-225 that may be used for future deployments. Assume that as part of a rollout of cDTA technology, SU cDTA transceivers 231-232 and CP cDTA transceivers 233-234 are coupled to the subscriber lines 224-225, respectively, as shown by FIG. 14. Also, assume that the SU legacy transceivers 211-213 are replaced by SU transceivers 228-230, which if desired may be of the same type as the cDTA transceivers 231-234. Thus, if any of the CP legacy transceivers 214-216 is replaced with a cDTA transceiver (not shown), then such new cDTA transceiver at a customer premises may communicate with its corresponding SU transceiver 228-230 at the service unit 25 according to the same cDTA algorithm used by the cDTA transceivers 231-234.

The frame coordination logic 66 is configured to provide control information to the transceivers 214-216 and 228-234 for causing each of the transceivers 214-216 and 228-230 to communicate according to the frame 251 shown by FIG. 13, referred to hereafter as "legacy frame," and for causing each of the cDTA transceivers 231-234 to communicate according to the frame 252 shown by FIG. 13, referred to hereafter as "cDTA frame." For the cDTA frame 252, the frame coordination logic 66 is configured to dynamically allocate upstream and downstream timeslots based on current traffic load conditions. As an example, there may be greater demands for downstream traffic for the cDTA transceivers 231-234 relative to the demands for upstream traffic such that the frame coordination logic 66 allocates a greater number of downstream timeslots in the cDTA frame 252, as illustrated by FIG. 13. Unlike the transceivers 214-216 and 228-230, the DS/US transition 128 may be moved for the cDTA transceivers 231-234 for other cDTA frames as traffic load conditions change or as may otherwise be desired.

Based on the timeslot allocation for the cDTA frame 252, the frame coordination logic 66 determines which timeslots of the legacy frame 251 conflict with an overlapping timeslot of the cDTA frame 252 (i.e., is allocated for a different direction relative to the overlapping timeslot of the cDTA frame 252). In the example shown by FIG. 13, five timeslots (i.e., the five time slots immediately prior to the DS/US transition 128) of the legacy frame 251 are determined to be conflicting. As shown by FIG. 13, the frame coordination logic 66 is configured to mute these five conflicting timeslots so that the transceivers 214-216 and 228-230 do not transmit data during these muted timeslots. In addition, the frame coordination logic 66 also controls the SU transceivers 228-230 so that they transition to the receive mode during these conflicting timeslots, thereby helping to improve crosstalk vectoring performed by the vector engine 69 during the conflicting timeslots.

Since the conflicting timeslots are muted, the transceivers 214-216 and 228-230 are permitted to transmit data only when their timeslots are allocated for the same direction as those for the cDTA transceivers, as shown by FIG. 13, thereby avoiding the introduction of increased levels of NEXT. By avoiding crosstalk that would otherwise result from the transmission of data in different directions through the binder, unacceptable levels of crosstalk affecting the transmissions of the cDTA transceivers 231-234 may be prevented such that it is unnecessary to remove or replace the legacy CP transceivers 214-216 before coupling the cDTA transceivers 231-234 to the subscriber lines 224-225. As indicated above, the upstream and downstream timeslots may be allocated differently for future frames for the cDTA transceivers 231-234, and similar techniques for selecting timeslots of the legacy frame for muting may be performed in order to avoid introducing significant levels of NEXT.

The invention claimed is:

1. A time-division duplexing system, comprising:
a first transceiver coupled to a first subscriber line, the first transceiver configured to communicate across the first subscriber line in accordance with a fixed frame format for which frame locations of transitions between downstream communication and upstream communication for each frame are fixed;
a second transceiver coupled to a second subscriber line and configured to communicate across the second subscriber line; and
at least one controller configured to receive, for the first transceiver, information indicative of a timing of at least one of the transitions between downstream communication and upstream communication, the at least one controller configured to dynamically allocate upstream capacity and downstream capacity for the second subscriber line according to a coordinated dynamic time assignment (cDTA) algorithm for dynamically selecting, for the second transceiver, frame locations of transitions between downstream communication and upstream communication, the at least one controller further configured to mute at least one timeslot for the first transceiver based on an allocation of timeslots for the second transceiver according to the cDTA algorithm, thereby reducing crosstalk that couples from the first subscriber line to the second subscriber line, wherein the at least one controller is configured to dynamically select the at least one timeslot for the first transceiver for muting based on (1) a timing of the at least one of the transitions for the second transceiver and (2) the timing of the at least one of the transitions for the first transceiver indicated by the information, if the at least one timeslot for the first transceiver overlaps with and is for a different communication direction than at least one timeslot for the second transceiver.

2. The system of claim 1, further comprising a third transceiver coupled to a third subscriber line and configured to communicate across the third subscriber line, wherein the controller is configured to control upstream capacity and downstream capacity for the third subscriber line according to the cDTA algorithm.

3. The system of claim 1, wherein the second transceiver is configured to operate in a transmit mode for the at least one timeslot for the second transceiver.

4. The system of claim 1, wherein the second transceiver is configured to operate in a receive mode for the at least one timeslot for the second transceiver.

5. The system of claim 1, wherein a communication direction for the at least one timeslot for the first transceiver is downstream, and wherein a communication direction for the at least one timeslot for the second transceiver is upstream.

6. The system of claim 1, wherein a communication direction for the at least one timeslot for the first transceiver is upstream, and wherein a communication direction for the at least one timeslot for the second transceiver is downstream.

7. The system of claim 1, wherein the controller has a vector engine for cancelling crosstalk that couples between the first subscriber line and the second subscriber line.

8. The system of claim 1, wherein a first timeslot for the first transceiver includes a sync symbol, wherein the controller is configured to control communication across the second subscriber line such that a second timeslot for the second transceiver includes a data symbol, wherein the second timeslot overlaps in time with the first timeslot, and wherein the controller has a vector engine configured to estimate, based on the sync symbol and the data symbol, crosstalk that couples between the first subscriber line and the second subscriber line.

9. The system of claim 1, wherein a first timeslot for the first transceiver includes a sync symbol, wherein the controller is configured to mute a second timeslot for the second transceiver based on a timing of the first timeslot, wherein the second timeslot overlaps in time with the first timeslot, and wherein the controller has a vector engine configured to estimate, based on the sync symbol, crosstalk that couples between the first subscriber line and the second subscriber line.

10. The system of claim 1, wherein a first timeslot for the first transceiver includes a first sync symbol, wherein the controller is configured to control communication across the second subscriber line such that a second timeslot for the second transceiver includes a second sync symbol, wherein the second timeslot overlaps in time with the first timeslot, and wherein the controller has a vector engine configured to estimate, based on the first sync symbol and the second sync symbol, crosstalk that couples between the first subscriber line and the second subscriber line.

11. The system of claim 1, wherein the at least one controller is configured to mute the at least one timeslot for the first transceiver by controlling the first transceiver to operate in a transmit mode during the at least one time slot without transmitting data across the first subscriber line.

12. The system of claim 1, wherein the first transceiver is configured to communicate across the first subscriber line with a fourth transceiver coupled to the first subscriber line, and wherein the at least one controller is configured to control the first transceiver during the muted at least one time slot such that both the first transceiver and the fourth transceiver simultaneously operate in one of a transmit mode or a receive mode.

13. The system of claim 1, wherein the first subscriber line and the second subscriber line are both in a vector group for vectoring operations that cancel crosstalk that couples between the first subscriber line and the second subscriber line.

14. The system of claim 10, wherein the second timeslot is in a frame for the second transceiver and the sync symbol of the second timeslot is communicated across the second subscriber line in a direction toward or away from the second transceiver, wherein the frame includes a third timeslot, and wherein the controller is configured to control communication across the second subscriber line such that the third timeslot includes a third sync symbol that is communicated in the direction that the sync symbol of the second timeslot is communicated.

15. A service unit, comprising:
a first service unit (SU) transceiver coupled to a first subscriber line, the first SU transceiver configured to communicate data for a first frame across the first subscriber line with at least a first customer premises (CP) transceiver in accordance with a fixed frame format;
a second SU transceiver coupled to a second subscriber line, the second SU transceiver configured to communicate data for a second frame across the second subscriber line with at least a second CP transceiver; and
at least one controller coupled to the first SU transceiver and the second SU transceiver and configured to dynamically allocate upstream capacity and downstream capacity for the second SU transceiver and the second CP transceiver according to a coordinated dynamic time assignment (cDTA) algorithm, the at least one controller further configured to determine whether a first communication direction for at least one timeslot of the first frame is conflicting with a second communication direction for at least one timeslot of the second frame that overlaps in time with the at least one timeslot of the first frame, the at least one controller further configured to dynamically select the at least one time slot of the first frame for muting based on allocation of the upstream capacity and the downstream capacity for the second SU transceiver by the at least one controller if the first communication direction conflicts with the second communication direction, the at least one controller further configured to mute the selected at least one time slot of the first frame, thereby reducing crosstalk that couples from the first subscriber line to the second subscriber line.

16. The service unit of claim 15, further comprising a third transceiver coupled to a third subscriber line and configured to communicate across the third subscriber line with a third CP transceiver, wherein the controller is configured to control upstream capacity and downstream capacity for the third subscriber line according to the cDTA algorithm.

17. The service unit of claim 15, wherein the first subscriber line and the second subscriber line are both in a vector group for vectoring operations that cancel crosstalk that couples between the first subscriber line and the second subscriber line.

18. A time-division duplexing method, comprising:
communicating with at least a first transceiver across a first subscriber line in accordance with a fixed frame format;
communicating with at least a second transceiver across a second subscriber line in accordance with a coordinated dynamic time assignment (cDTA) algorithm;
dynamically allocating, with at least one controller, upstream capacity and downstream capacity for the second subscriber line based on the cDTA algorithm;
receiving, with the at least one controller, information indicating a timing of at least one transition between upstream communication and downstream communication for the first transceiver;
dynamically selecting, with the at least one controller, at least one timeslot for the first transceiver for muting based on (1) a timing of at least one transition between upstream communication and downstream communication for the second transceiver and (2) the timing of the at least one transition for the first transceiver indicated by the information, if the at least one timeslot for the first transceiver overlaps with and is for a different communication direction than at least one timeslot for the second transceiver; and
muting the at least one timeslot for the first transceiver in response to the selecting, thereby reducing crosstalk that couples from the first subscriber line to the second subscriber line.

19. The method of claim 18, further comprising communicating with at least a third transceiver across a third subscriber line in accordance with the cDTA algorithm.

20. The method of claim 18, further comprising performing crosstalk vectoring to cancel crosstalk that couples between the first subscriber line and the second subscriber line.

21. The method of claim 18, wherein a first timeslot for the first transceiver includes a sync symbol, and wherein the method further comprises:
controlling communication across the second subscriber line such that a second timeslot for the second transceiver includes a data symbol, wherein the second timeslot overlaps in time with the first timeslot; and
estimating crosstalk that couples between the first subscriber line and the second subscriber line based on the sync symbol and the data symbol.

22. The method of claim 18, wherein a first timeslot for the first transceiver includes a sync symbol, and wherein the method further comprises:
muting a second timeslot for the second transceiver based on a timing of the first timeslot, wherein the second timeslot overlaps in time with the first timeslot; and
estimating crosstalk that couples between the first subscriber line and the second subscriber line based on the sync symbol.

23. The method of claim 18, wherein a first timeslot for the first transceiver includes a first sync symbol, and wherein the method further comprises:
controlling communication across the second subscriber line such that a second timeslot for the second transceiver includes a second sync symbol, wherein the second timeslot overlaps in time with the first timeslot; and
estimating crosstalk that couples between the first subscriber line and the second subscriber line based on the first sync symbol and the sync symbol.

24. The method of claim 18, wherein the muting is performed by controlling the first transceiver to operate in a transmit mode during the at least one time slot without transmitting data across the first subscriber line.

25. The method of claim 18, wherein the communicating with the first transceiver comprises communicating data across the first subscriber line between the first transceiver and a fourth transceiver coupled to the first subscriber line, and wherein the method further comprises controlling the first transceiver during the muted at least one time slot such that both the first transceiver and the fourth transceiver simultaneously operate in one of a transmit mode or a receive mode.

26. The method of claim 18, further comprising performing vectoring operations to cancel crosstalk that couples between the first subscriber line and the second subscriber line.

27. A time-division duplexing method, comprising:
communicating data for a first frame across a first subscriber line in accordance with a fixed frame format with at least a first pair of transceivers coupled to the first subscriber line;
communicating data for a second frame across a second subscriber line in accordance with a coordinated dynamic time assignment (cDTA) algorithm with at least a second pair of transceivers coupled to the second subscriber line;
dynamically allocating, with at least one controller coupled to the first transceiver and the second transceiver, upstream and downstream capacity for the second subscriber line based on the cDTA algorithm;
dynamically determining, with the at least one controller, based on the allocating whether a first communication direction for at least one timeslot of the first frame conflicts with a second communication direction for at least one timeslot of the second frame that overlaps in time with the at least one timeslot for the first frame;
dynamically selecting, with the at least one controller, the at least one timeslot of the first frame for muting based on the determining; and
muting the at least one timeslot of the first frame in response to the selecting, thereby reducing crosstalk that couples from the first subscriber line to the second subscriber line.

28. The method of claim 27, further comprising communicating data for a third frame across a third subscriber line in accordance with the cDTA algorithm with at least a third pair of transceivers coupled to the third subscriber line.

29. The method of claim 27, further comprising performing vectoring operations to cancel crosstalk that couples between the first subscriber line and the second subscriber line.

* * * * *